United States Patent
Normann et al.

[11] Patent Number: 6,018,993
[45] Date of Patent: Feb. 1, 2000

[54] METHOD FOR MONITORING TIRE PRESSURE

[75] Inventors: Norbert Normann, Niefern-Öschelbrinn; Ralf Kessler, Söllingen; Gunter Schulze, Ispringen, all of Germany

[73] Assignee: Doduco GmbH, Pforzheim, Germany

[21] Appl. No.: 09/068,833

[22] PCT Filed: Nov. 17, 1996

[86] PCT No.: PCT/EP96/05021

§ 371 Date: May 18, 1998

§ 102(e) Date: May 18, 1998

[87] PCT Pub. No.: WO97/18962

PCT Pub. Date: May 29, 1997

[30] Foreign Application Priority Data

Nov. 17, 1995 [DE] Germany .......................... 195 42 833
Mar. 5, 1996 [DE] Germany .......................... 196 08 478

[51] Int. Cl.[7] ........................................... B60C 23/02
[52] U.S. Cl. ............................................. 73/146.5
[58] Field of Search ......................... 73/146.5, 146; 340/443, 444, 445, 446, 447

[56] References Cited

U.S. PATENT DOCUMENTS 4,734,674 3/1988 Thomas et al. .................... 340/447
4,970,491 11/1990 Saint et al. ......................... 340/447
5,520,045 5/1996 Edri ..................................... 73/146

FOREIGN PATENT DOCUMENTS 9316891  9/1993  WIPO .
9420317  9/1994  WIPO .
9615919  5/1996  WIPO .

*Primary Examiner*—William Oen
*Attorney, Agent, or Firm*—Dvorak & Orum

[57] ABSTRACT

A method for allocating transmitters and receiving antennas in tire pressure monitoring systems which consist of a pressure sensor, a transmitter, and a transmitting antenna at each wheel, of a receiving antenna respectively allocated to them on the body, and of an electronic receiving and analysis system connected thereto via cables. In this, an identifier characterizing the wheel is allocated to each transmitter, and the signals are forwarded to the central electronic receiving and analysis system. The method comprises the steps of recording the intensities of the signals received by the respective receiving antennas and deriving from various transmitters, under the signals' identifiers; comparing the intensities of the signals of different identifiers received by one and the same receiving antenna, such that multiple successively received signals are taken into account in the intensity comparison; and lastly, selecting the transmitter identifier having the greatest intensity at a receiving antenna and allocating it to that receiving antenna.

14 Claims, 2 Drawing Sheets

METHOD FOR MONITORING TIRE PRESSURE

BACKGROUND OF THE INVENTION

1. Field of the Invention

The present invention relates to a method for monitoring tire pressure, and particularly a method for monitoring tire pressure by automatically comparing intensities of signals sent from different identifiers received by an antenna.

2. Description of the Related Art

The present invention proceeds from a method having the features indicated in the preamble of claim 1. A method of this kind is known from WO 93/16891, in which a combination of pressure sensor, transmitter, and transmission antenna, with respective allocated receiving antennas and a central electronic analysis system on the body, is used. The problem that arises with tire pressure monitoring systems of this kind is unequivocal allocation of the transmitters to the respective wheel position. In WO 93/16891 this problem of position recognition is solved as follows: the transmitters generate a signal divided into four segments, consisting of preface, identification signal, measurement signal, and conclusion. The central electronic analysis system can recognize the position based on the identification signal. Doing so, however, requires first performing an initialization during which the respective identification signal, linked to the respective position, is stored by the central electronic analysis performing an initialization during which the respective identification signal, linked to the respective position, is stored by the central electronic analysis system. To perform this initialization, the system must be manually switched into a "pairing" mode, and each individual transmitter must then be activated once in sequence. The system is then switched back into measurement mode until the transmitter positions change, e.g. if a wheel is changed. In a first variant, each wheel is associated with an antenna and a receiving element of its own, that are connected to a central evaluation unit. The central electronic receiving system assigned to each individual wheel receives signals from all wheels, with each signal arriving from a wheel being allocated to that receiving unit in which it produces the highest signal intensity. This allocation can be effected, and is intended to be effected, only in stationary condition of the vehicle. In a second variant of the known method, one manually switches a central analysis into the paring mode—likewise with the vehicle in stationary condition—preselects a specific wheel position, provokes an artificial pressure drop in that wheel, and then determines the identifier of the transmitted tire pressure signal and associates it to the respective wheel. In the case of both variants a suitably trained person must perform this initialization and subsequent allocating step each time a wheel is changed. In some circumstances it is therefore impossible, or possible only at the cost of safety, to perform a wheel change at any repair shop or at home. Flawless operation of the system cannot be guaranteed due to potential operating errors.

In WO 93/08036, the problem is circumvented by recording the data for the pressure sensors and the transmission electronics connected to them not by means of a central electronic analysis system on the body, but by means of a remote-control element. Said remote-control element comprises an LCD display device which makes it possible to read the tire pressure. To determine the tire pressure, the desired information must be interrogated at each individual wheel by means of the remote-control element. Although this method offers the advantage of an unequivocal allocation of readings, it does not allow tire pressure to be checked while driving.

BRIEF SUMMARY OF THE INVENTION

The object of the present invention is therefore to develop a method for position recognition which demands no special abilities of even inexperienced mechanics or automobile owners when the wheels need to be allocated, after a wheel change, to specific signal identifiers. The intent is to rule out any failure due to possible operating errors.

These values are then compared; multiple successively received signals are taken into consideration in order to avoid incorrect allocations. An average can then, for example, be taken of the multiple signals, or a simple count is made of how often the event occurs in which a specific antenna most strongly receives a transmitter, i.e. a signal with a specific identifier (claim 3). The receiving antenna is then allocated to the corresponding transmitter based on the average or the greatest number of events. Since the receiving antenna directly adjacent to a transmitter generally receives the signal at greater intensity than the other receiving antennas, and since, in addition, multiple signals are utilized for analysis, this method guarantees reliable allocation. And because this method operates automatically, there can inherently be no problems due to operating errors.

A further means of achieving the object, based on the same principle, is indicated in independent claim 2. In this, the roles of the receiving antennas and transmitters are switched as compared with what is recited in claim 1: what is observed, accordingly, is which of the various receiving antennas most strongly receives a specific transmitter, i.e. a signal with a specific identifier. In this case as well, multiple successive signals are taken into account, and an average is taken or a simple count is made of how often an antenna most strongly receives the signal with the selected identifier (claim 3).

DETAILED DESCRIPTION OF THE INVENTION

Figure 1:
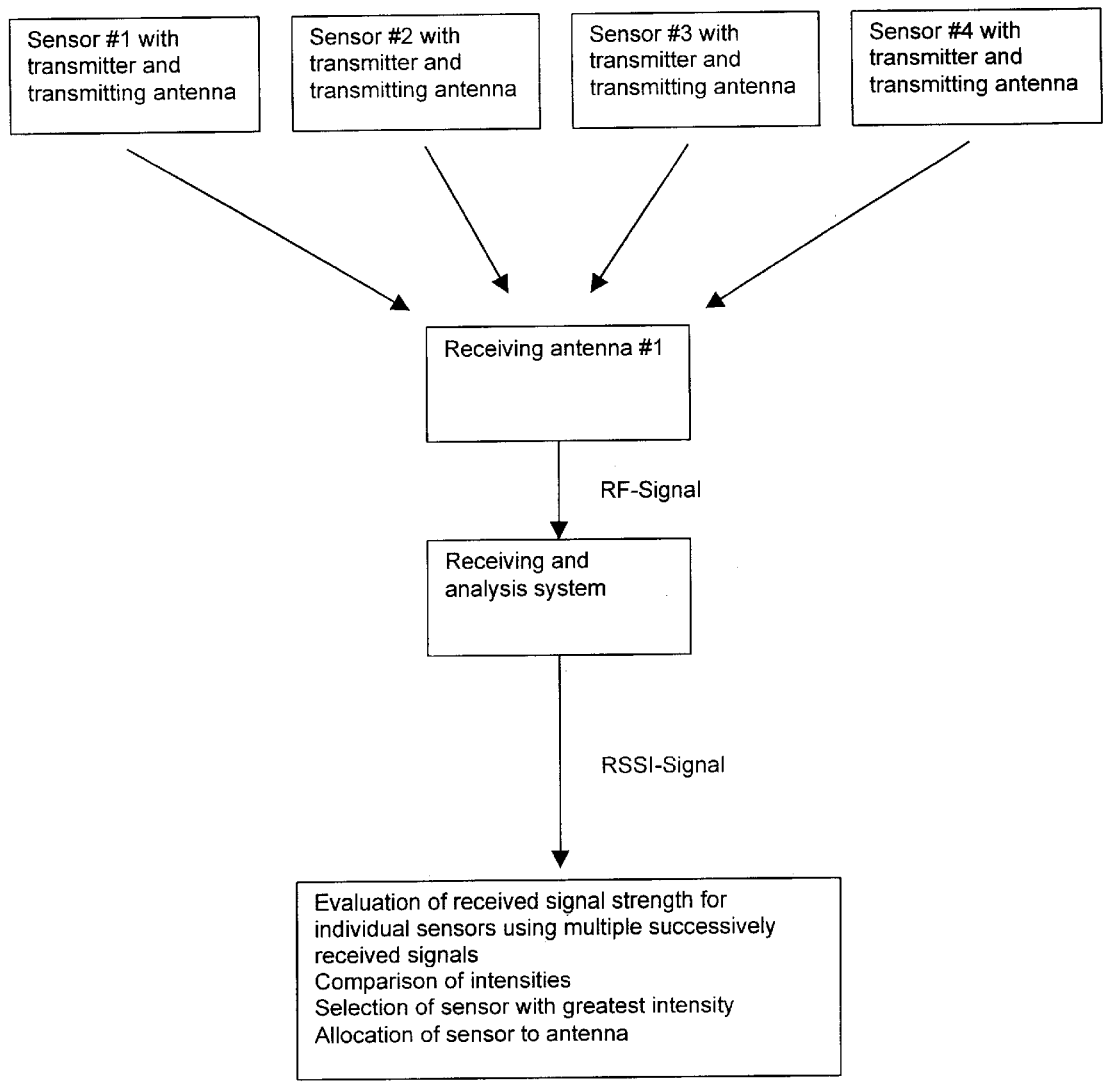
FIG. 1 is a block diagram of the steps in a method for monitoring tire pressure utilizing four sensors.
Figure 2:
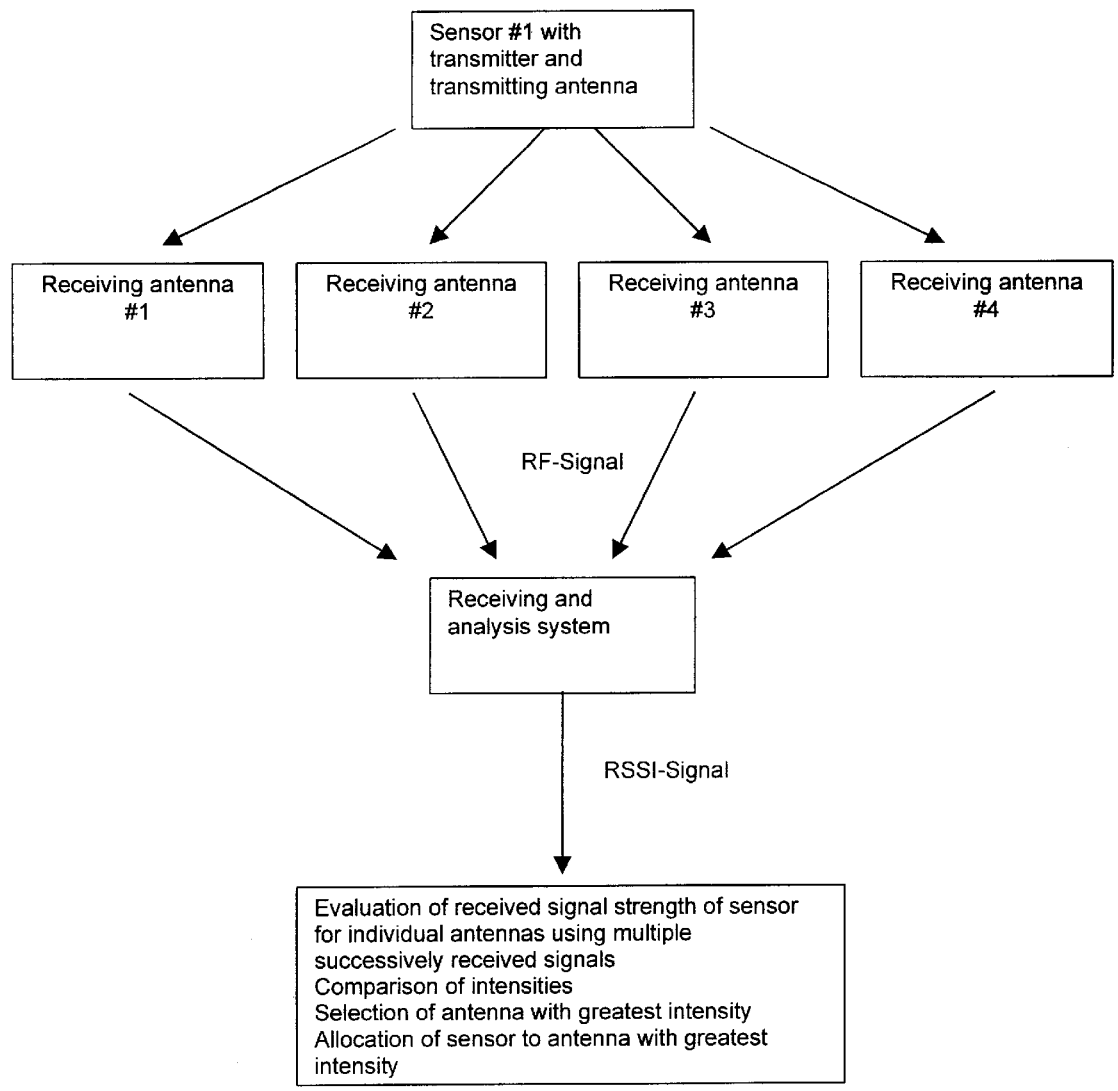
FIG. 2 is a block diagram of the steps in a method for monitoring tire pressure utilizing one sensor.

A possible procedure for storing the data obtained in this fashion in the electronic analysis system is described in claim 4. With this, an allocation matrix is constituted, consisting of all the transmitter identifiers and receiving antennas. In the course of the allocation process, the value in a matrix cell is incremented when the greatest intensity is measured for the relevant combination of receiving antenna and transmitter identifier.

In the manner described, the received signal can also simultaneously be used to allocate the transmitter identifier to all the receiving antennas. This is done by using, in particular, the procedure set forth in claim 2. With this, the intensities of the signals received via the various receiving antennas are compared with an identifier, and the value of the matrix cell for the combination of transmitter identifier and receiving antenna with the greatest intensity is incremented. After multiple signals with different identifiers have been received, the matrix can be used to create the allocation for all the receiving antennas. Because of an unfavorable wheel position, and thus unfavorable positioning of the transmitter with respect to the directly adjacent receiving antenna, the signal from a transmitter might be received at lesser intensity by the directly adjacent receiving antenna than by another receiving antenna. In this case the value of the wrong matrix cell would be incremented in the matrix. To prevent this, it is advantageous to use the method described in claim 5. With this, not only the signal with the greatest intensity but also the one with the second-greatest intensity is determined. If the difference between these two values yields a value above a specific limit value, the value of the matrix cell belonging to the greatest intensity is incremented. But if the value of the difference lies below that limit value, the reading is discarded. This procedure is based on the idea that with an unfavorable wheel position, it is indeed possible for an antenna other than the directly allocated one to receive the signal at the greatest intensity, but that in such a case the difference as compared with the second-greatest intensity is less than if the wheel position were favorable. The risk of an erroneous allocation can thus be reduced even further, and the process of achieving a reliable allocation can be speeded up.

The developments of the method according to the invention described in claims 6 and 7 can be used to speed up the allocation process. If, as described in claim 6, the value of the matrix cell is incremented not by a fixed value but by a value weighted in terms of the intensity difference, the result will be that the matrix cell with the maximum value can be determined more quickly. If a simple count is made of the number of events in which a signal with a specific identifier was received by a specific antenna at maximum intensity, it is correspondingly possible to weight the count, for example by counting the event once if the intensity of a signal with a specific identifier at an antenna was 10% higher than at the antenna at which the same signal occurred with the second-strongest intensity, counting twice if the intensity is at least 20% higher, counting three times if the intensity is at least 30% higher, etc.

It is additionally possible, as described in claim 7, to remove from the further allocation process those receiving antennas with an already-allocated transmitter identifier. In other words, once the first allocation has been determined, only the intensities of the remaining receiving antennas need to be compared.

The overall result is thus a reliable and quick allocation which, because it operates automatically, rules out possible operating errors. By means of the development of the invention described in claim 8, it is also possible to record transmitter interchanges caused by possible wheel changes with no need for external action on the system. With this, at regular intervals the value of the matrix cells for transmitters with allocated receiving antennas is set to a fixed value Ds, while the value of matrix cells for transmitters without allocated receiving antennas is set to zero. The value Ds can be used to define a time after which the allocation is determined again. This could be done, for example, by counting down from the fixed value Ds at defined time intervals. Once the value of the relevant matrix cells then reaches zero, the allocation is determined again. value of the relevant matrix cells then reaches zero, which occurs simultaneously for the cells previously set to the value Ds, the allocation is determined again.

Signals which derive from transmitters located on wheels which are rotating (running wheels) are received with fluctuating signal levels because the location of the transmitter relative to the receiving antenna changes cyclically as a result of the wheel rotation. The situation is different for onboard spare wheels. When signals emitted from a spare wheel are received, they do not exhibit the fluctuations in signal level resulting from vehicle motion. This makes it possible to find an additional criterion by which to distinguish between signals coming from a spare wheel and signals coming from running wheels. Developments of the invention which allow this distinction are the subject of claims 9 and 10. If, while the vehicle is in motion, a signal received by an antenna which is allocated to one of the running wheels does not exhibit any of the fluctuations in signal level caused by wheel rotation, it may be concluded therefrom that it derives from an onboard spare wheel and not from a running wheel, even if that signal whose level exhibits no motion-related fluctuations is received at the greatest intensity by the receiving antenna in question which is allocated to a running wheel. According to claim 9, such a signal is either allocated to a spare wheel or is left entirely out of consideration (the latter, in particular, if onboard spare wheels are not intended to be monitored). This development of the invention has the advantage that the risk of erroneous allocations is once again reduced. This is true particularly with regard to those running wheels which are located closest to the spare wheel, since with these the receiving antenna which belongs to a running wheel that is arranged in the vicinity of a spare wheel could receive the signals emitted from the spare wheel at approximately the same intensity as the signals emitted from the running wheel. The development of the invention ensures that erroneous allocations do not occur even in this unfavorable case. reception of the signals emitted from the spare wheel, and correct allocation thereof, can also be accomplished by an antenna that is allocated to an adjacent running wheel.

The distinction between a spare wheel and a running wheel as indicated in claim 10 can be made in corresponding fashion in the case of the method indicated in independent claim 2. With this variant method as well, a separate receiving antenna for the spare wheel can be dispensed with.

The method indicated in claims 9 and 10 is useful not only when, as is usual, a single spare wheel is carried on board, but also when multiple replacement wheels are carried. When additional wheels with snow tires are carried in the trunk, for example, the signals emitted by them cannot disrupt the correct allocation of the running wheels to their receiving antennas.

Another possibility for distinguishing between signals coming from rotating wheels and signals coming from replacement wheels is indicated in claims 11 and 12. These procedures can be used instead of or in combination with the procedures in claims 9 and 10. They make use of the fact that in the initial phase of vehicle motion after motion begins, the tire temperature generally rises due to flexing. This is not the case with a spare wheel, since its tire is not flexed. If a temperature sensor is provided in the tire pressure monitoring system at each wheel in addition to the pressure sensor, and if the signal emitted by the transmitter on the wheel transfers information not only about tire pressure but also about tire temperature, a temperature rise signaled after vehicle motion begins can then be evaluated as an indication that the signal derives from a rotating wheel and not from a spare wheel.

What is claimed is:

1. A method for allocating transmitters and receiving antennas in tire pressure monitoring systems on vehicles, which systems consist of a pressure sensor, a transmitter, and a transmitting antenna at each wheel, of a receiving antenna respectively allocated to them on the body, and of an electronic receiving and analysis system connected thereto via cables, by allocating an identifier characterizing the wheel to its transmitter, by emitting signals containing the identifier, and by forwarding the signals to the central electronic receiving and analysis system, recording the intensities of the signals received by the respective receiving antennas from various transmitters, under the signals' identifiers, and allocating the identifier of the signal having the greatest intensity at an antenna to that antenna, characterized in that the intensities of the signals of different identifiers received by one and the same receiving antenna are automatically compared, even with the vehicle in motion, such that multiple successively received signals are taken into account cumulatively in the intensity comparison;

and that the transmitter identifier contained in the signal having the greatest intensity at a receiving antenna is selected and allocated to that receiving antenna.

2. A method for allocating transmitters and receiving antennas in tire pressure monitoring systems on vehicles, which systems consist of a pressure sensor, a transmitter, and a transmitting antenna at each wheel, of a receiving antenna respectively allocated to them on the body, and of an electronic receiving and analysis system connected thereto via cables, by allocating an identifier characterizing the wheel to its transmitter, by emitting signals containing the identifier, and by forwarding the signals to the central electronic receiving and analysis system, recording the intensities of the signals received by the respective receiving antennas from various transmitters, under the signals' identifiers, and selecting the receiving antenna that receives the signal with the selected identifier with the greatest intensity, and allocating it to the identifier of the respective transmitter, characterized in that the intensities with which of the signals deriving from a transmitter are received at the different receiving antennas are automatically compared, even with the vehicle in motion, such that multiple successively received signals of each identifier are taken into account cumulatively in each intensity comparison.

3. The method as defined in claim 1, characterized in that those events in which signals with a specific identifier were received by a specific receiving antenna at maximum intensity are counted under an address which allocates the transmitter's identifier to the relevant antenna.

4. The method as defined in claim 1, characterized in that there is constituted in the electronic analysis system a matrix, consisting of transmitter identifiers and receiving antennas, in which the value of an individual matrix cell is incremented when the greatest intensity is recorded for the relevant combination of transmitter identifier and receiving antenna.

5. The method as defined in claim 4, wherein the signal with the second-greatest intensity is determined, and the difference between the greatest and second-greatest intensity is taken and compared with a limit value; and if the limit value is exceeded, the value of the transmitter identifier/receiving antenna matrix cell for the greatest intensity is incremented, but the reading is discarded if the value does not exceed the limit value.

6. The method as defined in claim 4, wherein the value by which the number of events of a specific allocation is incremented when a further event occurs, or by which the content of a matrix cell is incremented, is weighted in terms of the intensity difference between the two respective greatest intensities.

7. The method as defined in claim 1, wherein after allocation of a transmitter to a receiving antenna, the latter is no longer utilized for the further allocation process by means of an intensity comparison.

8. The method as defined in claims 4, wherein the values in the matrix cells are set, at specific time intervals, to a fixed value Ds for transmitters with allocated receiving antennas, and to zero for transmitters without allocated receiving antennas, Ds defining a time after which the allocation is checked.

9. The method as defined in claim 1, wherein the signals that are received by a receiving antenna which is allocated to one of the running wheels are examined for fluctuations in the signal level;

and said receiving antenna is allocated to that transmitter identifier which belongs to the signal which, with the vehicle in motion, has the greatest intensity among the signals received by that receiving antenna with fluctuating signal levels, whereas signals whose signal level does not fluctuate due to vehicle motion are allocated with their identifier to one or more onboard spare wheels or are left out of consideration in the allocation.

10. The method as defined in claim 2, wherein the signals that derive from each one of the transmitters are examined for fluctuations in the signal level; and the transmitters whose signals are received with fluctuating signal levels as a result of vehicle motion are allocated to running wheels, whereas any transmitters whose signals are received with a signal level which does not fluctuate as a result of vehicle motion are allocated to one or more onboard spare wheels, or are left out of consideration.

11. The method as defined in claim 1, wherein the tire pressure monitoring system additionally contains a temperature sensor at each wheel, and the transmitter provided at the wheel emits signals which contain not only information about the measured pressure, but also information about the measured temperature;

the signals that are received by a receiving antenna which is allocated to one of the running wheels are examined for a temperature rise occurring in the first phase of vehicle operation; and the transmitter identifier allocated to said receiving antenna is that which belongs to the signal which, among the signals which display a rise in temperature during vehicle operation, is received at the greatest intensity, whereas signals which do not display a temperature rise as a result of vehicle operation are allocated with their identifier to one or more onboard spare wheels, or are left out of consideration during allocation.

12. The method as defined in claim 2, wherein the tire pressure monitoring system additionally contains a temperature sensor at each wheel and the transmitter provided at the wheel emits signals which contain not only information about the measured pressure, but also information about the measured temperature;

the signals that derive from each one of the transmitters are examined for a temperature rise; and the transmitters whose signals show a temperature rise as a result of vehicle motion are allocated to running wheels, whereas any transmitters whose signals do not display a temperature rise as a result of vehicle motion are allocated to one or more onboard spare wheels or are left out of consideration.

13. The method as defined in claim 2, wherein there is constituted in the electronic analysis system a matrix, consisting of transmitter identifiers ans receiving antennas, in which the value of an individual matrix cell is incremented when the greatest intensity is recorded for the relevant combination of transmitter identifier and receiving antenna.

14. The method as defined in claim 2, wherein after allocation of a transmitter to a reciving antenna, the latter is no longer utilized for the further allocation process by means of an intensity comparison.

\* \* \* \* \*